April 27, 1954  S. J. POPEIL  2,676,531
COFFEE MAKER
Filed Dec. 6, 1952
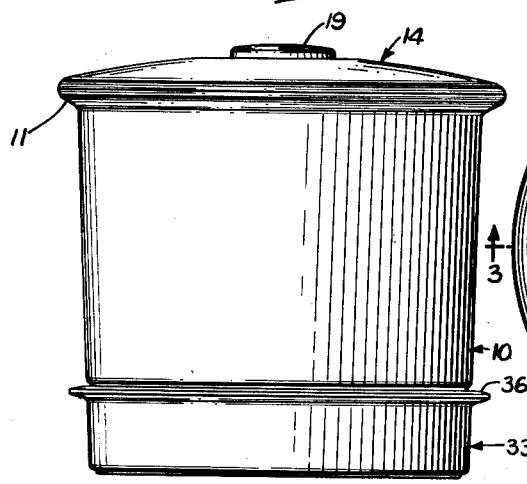
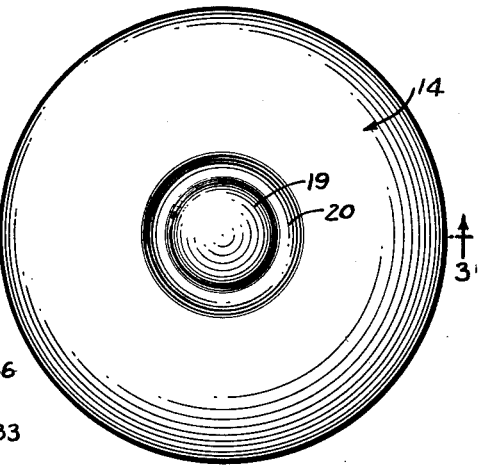
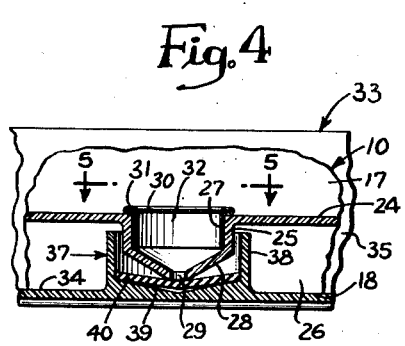
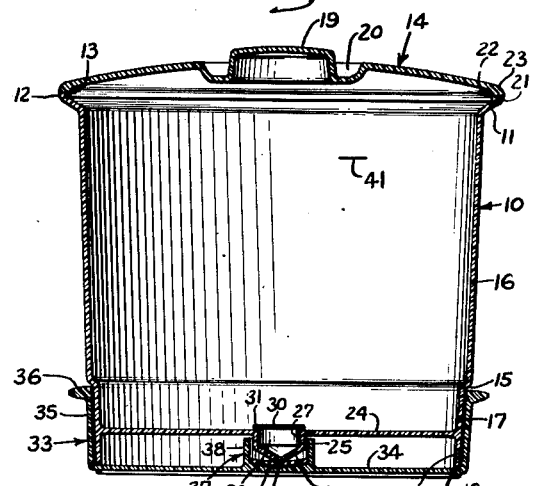
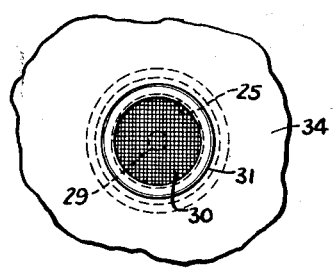
INVENTOR.
Samuel J. Popeil
BY
Attys.

Patented Apr. 27, 1954

2,676,531

UNITED STATES PATENT OFFICE 2,676,531

COFFEE MAKER

Samuel J. Popeil, Chicago, Ill.

Application December 6, 1952, Serial No. 324,477

1 Claim. (Cl. 99—299)

The present invention relates generally to improvements in coffee makers, and has particular reference to a new and improved coffee maker for producing a concentrated cold-water coffee extract which may be diluted with hot or cold water when desired as a beverage.

One of the objects of the present invention is to provide a conventional coffee extract maker which is simple and inexpensive in construction, and efficient and reliable in operation.

Another object is to provide a coffee maker of the foregoing character which comprises a comparatively small number of parts and can be readily cleaned.

A further object resides in the provision of a new and improved coffee maker comprising a container having an outlet nozzle at the bottom through which the coffee extract may be drained, and means for effectively sealing the nozzle while the extract is being made.

Other objects and advantages will become apparent as the description proceeds.

In the accompanying drawings,

Figure 1 is a side elevational view of a coffee maker embodying the features of the present invention.

Fig. 2 is a top plan view.

Fig. 3 is an axial sectional view taken along line 3—3 of Fig. 2.

Fig. 4 is a fragmentary detail sectional view taken in the same plane as Fig. 3, but on an enlarged scale.

Fig. 5 is a fragmentary detail sectional view taken along line 5—5 of Fig. 4.

Referring more particularly to the drawings, the coffee maker constituting the exemplary embodiment of the invention comprises a container 10 which may be made of any suitable material and in various sizes and shapes. Thus, the container may be made of metal, glass or suitable plastic, and preferably is molded in one piece or integral construction out of a thermosetting plastic, such as polystyrene or polyethylene. In the preferred form, the container 10 is generally cylindrical in shape, open at the top, and of a size to hold conveniently approximately two quarts of water and one pound of ground coffee. At the upper open end, the container 10 is formed with an outwardly-flaring circumscribing flange or rim 11 which terminates in a slightly thickened upright marginal bead 12, and the interior of which defines an annular shoulder 13 adapted to serve as a seat for the complemental marginal edge of a removable cover 14. The lower end portion of the container 10 is slightly inset circumferentially as indicated at 15 so that it is somewhat smaller in mean diameter than the upper portion. Thus the side of the container 10 is formed of two peripheral wall sections, namely an upper section 16 of relatively large diameter extending through most of the height to the rim 11, and a lower section 17 of slightly smaller diameter extending to the bottom edge 18. Preferably, both peripheral side wall sections 16 and 17 are slightly tapered downwardly on the same degree.

The cover 14, which preferably is provided for closing the container 10 during the coffee making operation so as to keep out undesirable dust and other foreign matter, also may be made of any suitable material and in any desired shape. In the present instance, it is molded in one piece and of the same material as the container 10, namely polystyrene or polyethylene. In the preferred form, the cover 14 is slightly dome-shaped, and thus concave on the inner side. The center portion of the cover 14 is configurated to define a generally round hand knob 19 which is encircled by an annular groove 20 formed by depressing the contiguous portion of the top wall. The marginal circular edge portion of the cover 14 is turned down and thickened, and has an annular groove 21 formed therein so as to define a depending flange 22 adapted to telescope within the bead 12 substantially to the seat 13. Also defined by the groove 21 is a lateral circumferential bead or shoulder 23 of the same outside diameter as the bead 12 and adapted to rest on the latter when the cover 14 is in place.

The container 10 has a flat bottom wall 24 which is formed with a central depending drain or outlet nozzle 25, and which is located in elevated position within the wall section 17 above the bottom edge 18 at least equal to and preferably slightly greater than the depending length of the nozzle 25. If desired, the top surface of the wall 24 instead of being formed flat as shown, may be slightly tapered toward the center. Thus, the lower portion of the wall section 17, i. e., that portion below the bottom wall 24, defines an annular skirt or leg means 26 whereby the container 10 may be held in equilibrium on a suitable support (not shown) without interference by the nozzle 25. The skirt 26 also serves the useful purpose of preventing inadvertent lateral displacement of the container 10 when the latter is positioned on another container or utensil (not shown) arranged therebeneath to receive the coffee extract draining through the nozzle 25.

The nozzle 25, preferably, is hollow cylindrical at the portion contiguous to the wall 24, through which it has a full inner diametrical opening 27, and then tapers toward the free end to define a cone 28 having a central or axial discharge opening 29. Although the precise dimensions are not closely critical, satisfactory results are obtainable with an inlet opening 27 of approximately .722 inch in diameter, and a discharge opening of approximately .125 inch in diameter.

To provide means for straining the coffee extract from the grounds, a removable screen 30 is normally supported across the opening 27. In the present instance, the screen 30 consists of a fine wire mesh supported in a circular rim 31 which is adapted to rest on the inner marginal edge portion of the bottom wall 24, and which is formed with a depending annular centering flange 32 adapted to be inserted through the opening 27 snugly but removably into the upper cylindrical portion of the nozzle substantially down to the cone 28.

Suitable means is provided for closing the nozzle 25 with a fluid-tight seal to prevent leakage during the coffee extraction operation and until the finished extract is to be drained off. In the present instance, this means comprises a bottom cap 33 having a closed flat bottom wall 34, a generally cylindrical, slightly-tapered peripheral side wall 35 complemental in size and shape with the wall section 17 to telescope thereover with a loose fit for ready separation, and an external circumferential flange 36 at the upper marginal edge. The cap 33 is of a depth such that it will extend substantially to the inset juncture 15. This cap 33 also may be made of any suitable material, and this may be molded in one piece of the same material as the container 10, namely polystyrene or polyethylene.

Formed integrally on the interior of the wall 34 is an upwardly opening coaxial cup 37 having an upstanding cylindrical wall 38 to receive the nozzle 25 and to interfit telescopically with the upper cylindrical portion thereof. The cup 37 also has a closed bottom wall 39 which is formed by thickening the center portion of the wall 34, and which is tapered downwardly toward the center axis. A soft disk 40 of rubber or similar resilient material is snugly inserted within the cup 37 into position immediately over the bottom wall 39, and normally is spaced from the latter by reason of the taper of the wall. However, when the container 10 is inserted into the cap 33, the tip of the nozzle 25 will engage the disk 40 and depress it at the center toward the surface of the wall 39 as permitted by the taper of the latter, and will cause the disk to conform generally to the exterior shape of the tip of the cone 28, thereby closing and sealing the discharge or drain opening 29. The weight of the container 10 and its contents serves to press the nozzle into tight engagement with the disc 40 to insure tight sealing of the opening 29.

In use, the container 10 is placed in the bottom cap 33 to seal the nozzle discharge opening 29 against leakage. Then ground coffee and cold water in the desired amounts are introduced into the container through the top, and allowed to stand therein in direct and intimate contact for a sufficient period of time to effect extraction from the coffee grounds into solution in the water of the desired flavor-producing elements. One acceptable procedure is put in the ground coffee first, preferably regular grind, then add the water to the indicated water line 41 located about one inch from the top of the container, and then slightly stirring the mixture to insure complete wetting. While the proportions are subject to variation, I have found that good results are obtainable by using one pound of coffee with approximately two quarts of water, and allowing them to stand for a period of from eight to twelve hours or more. It is often convenient to allow the brew to stand overnight.

The flange 36 on the cap 33 affords a convenient hand grip whereby the entire assembly may be lifted and carried to some desired place for location during the brewing or extraction period. During this period, the cover 14 may be used to close the container 10.

After the extraction operation has been completed, the container 10 is lifted from the bottom cap 33, and quickly placed in position over any convenient receptacle (not shown) into which the coffee extract is to be drained. The top flange 11 affords a convenient hand grip whereby the container 10 may be thus lifted and transferred. Since the cap 33 has been removed, the nozzle 25 is now open and free to drain off the coffee extract from the grounds which remain in the bottom of the container 10. For satisfactory results, the coffee-water mixture should not be stirred or disturbed during or after infusion.

The resulting extract constitutes a high coffee concentrate, containing the most desirable of the soluble ingredients influencing the coffee flavor, while being devoid of the undesirable ingredients commonly present when coffee is brewed with hot water. The coffee extract may be stored preferably under refrigeration for a considerable period without becoming deteriorated, and can be used from time to time as desired by taking small quantities thereof and diluting them with hot or cold water as desired to obtain a beverage of the desired strength and flavor.

It will be understood that the size of the drain or discharge opening 29 may be varied within reasonable limits. There are however certain considerations influencing the optimum size. Thus, if the opening is made comparatively small it will unduly prolong the time required for draining or may not drain adequately. On the other hand, if the opening is made comparatively large, it will be more difficult to seal and will result in some substantial loss of liquid when transferring the container 10 from the cap 33 to the extract-receiving vessel. An opening of 1/8 inch diameter has been found to be satisfactory since it is readily sealed and permits the extract to be drained off in a comparatively short period of time, namely within approximately three minutes, and prevents the loss of all but a few drops of the liquid in the transfer step.

The cone-shaped tip 28 of the nozzle 25 serves to direct the coffee extract to the discharge opening 29. The interior of the nozzle 25 defines a space which will contain a substantial body of strained coffee extract. As a result, the coffee extract will flow in an uninterrupted well-defined stream, i. e. without stop and go, through the opening 29, and will not tend to spread by reason of adhesion from the opening over the contiguous area of the bottom surface to the wall 24.

I claim as my invention:

A coffee maker comprising, in combination, a container closed at the bottom and open at the top for containing ground coffee and cold water in intimate contact to carry out infusion of the coffee, a depending nozzle opening centrally from the bottom of the container, and having a tip formed with a discharge opening, an element at the inlet to said nozzle for filtering off the coffee extract from the residual coffee grounds, a depending skirt on the lower end of said container extending about said nozzle and at least to the depth of said nozzle so as to sustain said container in a state of equilibrium on a support, a closed flat bottom cap adapted removably to receive said skirt, a cup on the bottom wall of said cap and adapted to receive said nozzle when said cap is in position and having a central depression in the bottom wall, and a soft resilient disk seated in said cup over said depression and being engageable by said nozzle tip to close said discharge opening.

References Cited in the file of this patent

UNITED STATES PATENTS

| Number | Name | Date |
| --- | --- | --- |
| 35,747 | Ernst | July 1, 1862 |
| 124,579 | Hutchinson | Mar. 12, 1872 |
| 309,783 | Houghton | Dec. 23, 1884 |
| 885,037 | Glover | Apr. 21, 1908 |
| 1,365,068 | Tuite | Jan. 11, 1921 |
| 1,701,194 | Rosenstein et al. | Feb. 5, 1929 |
| 2,069,229 | Ferris | Feb. 2, 1937 |

FOREIGN PATENTS

| Number | Country | Date |
| --- | --- | --- |
| 1,739 | Great Britain | 1888 |